Jan. 25, 1927.  J. R. SNYDER  1,615,599
AUTOMOBILE APPLIANCE
Filed Nov. 28, 1923
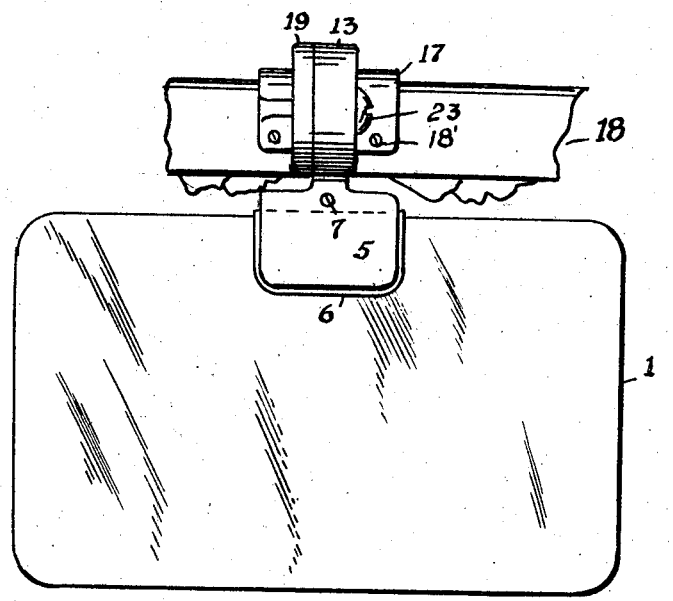
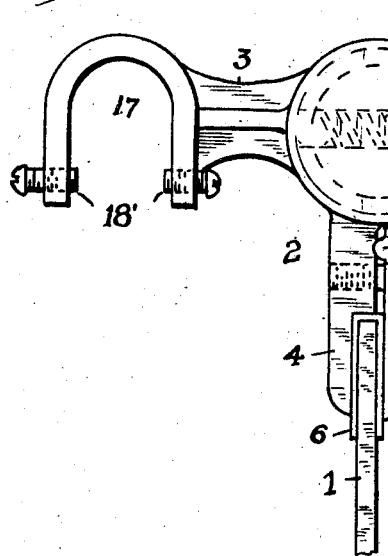
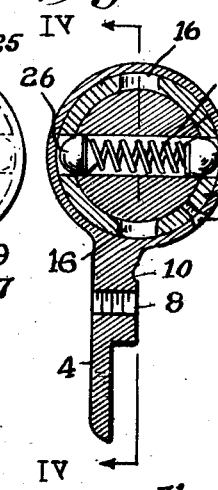
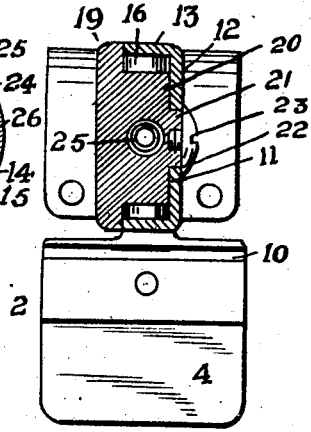
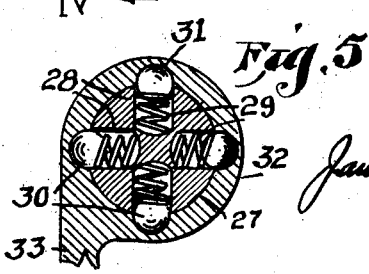
INVENTOR
James R. Snyder Patented Jan. 25, 1927.

1,615,599

UNITED STATES PATENT OFFICE.

JAMES R. SNYDER, OF PITTSBURGH, PENNSYLVANIA, ASSIGNOR OF ONE-THIRD TO FRANK W. DIBLE, OF TURTLE CREEK, PENNSYLVANIA, AND ONE-THIRD TO GEORGE GETSIE, OF BRADDOCK, PENNSYLVANIA.

AUTOMOBILE APPLIANCE.

Application filed November 28, 1923. Serial No. 677,500.

This invention relates to glare shields, adapted for use in connection with the operation of motor vehicles for protecting the eyes of the driver at night from the glare of the headlights of an approaching vehicle or from the glare of the sun during daytime, but more particularly to the attaching device for adjustably securing the glare shield in position.

Important objects of the invention are to provide an attaching device for glare shields, which may be adjusted to and automatically locked in various positions, which includes novel means for pivotally connecting the attaching members, which is simple in its construction and arrangement, strong, durable and efficient in its use, positive in its action, attractive in appearance, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing forming a portion of this specification and wherein like numerals of reference designate corresponding parts throughout the several views:—

Figure 1 is a rear elevation of a glare shield in the operative position, in accordance with this invention and attached to an automobile wind shield, a portion of the latter being broken away.

Figure 2 is a side view of the device.

Figure 3 is a cross sectional view of the hanger arm and associated parts.

Figure 4 is a view on line IV—IV, Figure 3.

Figure 5 is a cross sectional view of a modified form of attaching device, with portions thereof broken away.

Referring in detail to the drawing 1 denotes a panel constructed from colored glass carried by the hanger arm 2, which latter is adjustably connected to the supporting bracket 3.

The lower portion of the hanger arm 2 is formed to provide a clamping element consisting of an inset portion 4 and a binding plate 5. The upper marginal edge of the glass panel 1 is overlapped by a resilient liner 6 to prevent breakage and is clamped between the inset portion 4 and the binding plate 5, by means of the clamp screw 7. The latter extends loosely through an aperture provided therefor in the binding plate 5 and engages in the threaded aperture 8 formed in the hanger arm 2. The upper end of the binding plate 5 is formed on its inner face with a projection 9, which seats in the recess 10 formed in the inner face of the hanger arm 2. The engagement of the projection 9 in the recess 10 facilitates the parallel alignment of the binding plate 5, with respect to the inset portion 4, of the arm 2, and in conjunction with the clamp screw 7, establishes equalized distribution of the clamping pressure throughout the entire area of the engaged portion of the glass panel 1.

The upper end of the hanger arm 2 is formed to provide a horizontally extending socket 11, disposed at right angles with respect to the clamping element. The socket member 11 is formed by a bottom 12 provided with an integral annular flange 13. A hard metal bushing 14 is mounted in the socket member 11 and is fixedly secured against the inner face of the flange 13 by means of a screw 15, or in any other suitable manner. The bushing 14 is provided with a plurality of aperture forming pockets 16 when the bushing 14 is assembled in the socket member 11, in the manner above described. Four such pockets 16 are shown in the preferred form of the device, each of which is disposed at right angles with respect to adjacent pockets, and each is diametrically disposed relatively to another of said pockets to provide one pair of pockets aligned vertically, and the other pair of pockets aligned horizontally when the device is in the operative position.

The supporting bracket 3 has its front portion formed to provide a yoke 17 which overlaps the top member 18 of an automobile wind shield and is secured thereto by a plurality of screws 18'.

The supporting bracket 3 extends rearwardly and the rear end thereof is formed to provide a circular head 19 extending rearwardly and vertically edgewise at right angles with respect to the yoke 17.

The inner face of the head 19 is formed with a plug 20 of less diameter than the head 19 to allow of its insertion into the socket member 11 when the bushing 14 is mounted in the latter. When the plug 20 is inserted in the socket member 11 the edge of the annular flange 13 seats on the inner marginal edge portion of the head 19, as clearly shown in Figure 4, of the drawing.

The plug 20 is integrally formed with a centrally disposed neck 21 which extends into an opening 22 provided therefor in the bottom 12 of the socket member 11. The neck 21 is provided with a threaded aperture for the engagement of the connecting screw 23, the head of which overlaps the end of the neck 21 and engages the outer face of the bottom 12. The connecting screw 23 establishes a pivotal connection allowing the adjustment of the hanger arm 2 and the panel 1, carried thereby, relatively to the supporting bracket 3.

The plug 20 is provided with a diametrically extending horizontal bore 24 in which a spiral spring 25, is mounted. A steel locking ball 26 is mounted in each terminus of the bore 24 and is engaged by respective ends of the spring 25, as clearly shown in Figure 3 of the drawing.

When the panel 1 is in the operative position, it is disposed perpendicularly, as shown in Figure 1, of the drawing, and the locking balls 26 will engage in the pair of pockets 16 which are then in horizontal alignment therewith thereby locking the hanger arm 2 and the panel 1, carried thereby, in such perpendicular operative position.

When shifting the panel 1 to the inoperative or horizontal position, the other pair of aligned pockets 16 will be engaged by the locking balls 26, and lock the arm 2 and the panel 1 in the horizontal or inoperative position.

During the shifting operation the locking balls 26 will enter the bore 24 by compressing the spring 25 and frictionally engage the inner face of the bushing 14, until they are aligned with a respective pair of pockets 16, when the action of the spring 25 will cause their engagement in said pair of pockets 16, to provide the locking operation, in the manner above described.

The hardened bushing 14 is primarily provided to prevent scoring due to the frictional travel thereof on the locking balls 26 during the adjustment of the glass panel 1 to the operative or inoperative position, but its embodiment in the construction will also provide for the economical manufacture of the device.

The modified form of the device, illustrated in Figure 5, of the drawing, is identical in construction and operation to that described relative to the preferred form, with the exception that the plug 27 is formed with a plurality of individual bores 28, in each of which a spring 29 and locking ball 30 is mounted. The latter engage in correspondingly arranged pockets 31 formed in the flange 32 of the hanger arm 33, and as illustrated, provide four independent locking units instead of but two as illustrated and described relative to the preferred form.

It will of course be obvious that any desired number of locking units may be successfully employed, and their arrangement such as to best meet conditions found in practice, and while locking elements illustrated and described herein only provide for the locking of the arm and panel in either the horizontal or perpendicular position, it is to be understood that locking elements embodying the principle disclosed, may be provided and arranged to permit of the locking of the panel at various angular positions or adjustments.

What I claim is:

1. A glare shield attachment comprising an attachment member having its rear end formed with a plug, said plug provided with a head having a reduced neck at its free end to form a pivot, an adjustable hanger element having its upper end formed with a socket member abutting against the head and surrounding the body of the plug and further abutting against the free end of the latter, said element provided with an opening into which extends said neck, means engaging in the neck and overlapping said element for connecting the latter and said member together, and means carried by the plug and engaging said element for detachably securing the hanger element in adjusted position.

2. A glare shield attachment comprising an attachment member having its rear end formed with a plug, said plug provided with a head having a reduced neck at its free end to form a pivot, an adjustable hanger element having its upper end formed with a socket member abutting against the head and surrounding the body of the plug and further abutting against the free end of the latter, said element provided with an opening into which extends said neck, means engaging in the neck and overlapping said member for connecting the latter and said member together, an annular boss mounted in said element and formed with a plurality of pairs of pockets, the pockets of each pair opposing each other, and spring controlled means carried by the plug and simultaneously engaging in the pockets of a pair for detachably securing the hanger element in the adjusted position.

In testimony whereof I affix my signature.

JAMES R. SNYDER.